(12) United States Patent
Bernardini et al.

(10) Patent No.: US 7,668,905 B2
(45) Date of Patent: Feb. 23, 2010

(54) METHOD, SYSTEM AND COMPUTER PROGRAM FOR PROVIDING WEB PAGES BASED ON CLIENT STATE

(75) Inventors: Gianluca Bernardini, Rome (IT); Rosario Gangemi, Rome (IT); Gaetano Ruggiero, Salerno (IT); Marcello Velati, Rome (IT)

(73) Assignee: International Business Machines Corporation, Armonk, NY (US)

( * ) Notice: Subject to any disclaimer, the term of this patent is extended or adjusted under 35 U.S.C. 154(b) by 600 days.

(21) Appl. No.: 11/291,441

(22) Filed: Dec. 1, 2005

(65) Prior Publication Data
US 2007/0055725 A1 Mar. 8, 2007

(30) Foreign Application Priority Data
Sep. 7, 2005 (EP) .................................. 05108195

(51) Int. Cl.
*G06F 15/16* (2006.01)
(52) U.S. Cl. ........................................................ 709/203
(58) Field of Classification Search .................. 709/203
See application file for complete search history.

(56) References Cited

U.S. PATENT DOCUMENTS

| 6,112,240 | A  | * | 8/2000 | Pogue et al. ............... 709/224 |
| 2005/0132349 | A1 | * | 6/2005 | Roberts et al. ............. 717/168 |
| 2005/0144616 | A1 | * | 6/2005 | Hammond et al. .......... 717/173 |
| 2005/0192099 | A1 | * | 9/2005 | Nguyen et al. ............... 463/42 |
| 2006/0041931 | A1 | * | 2/2006 | Boxall et al. ................... 726/4 |
| 2006/0107088 | A1 | * | 5/2006 | Katayama et al. .............. 714/4 |
| 2006/0187891 | A1 | * | 8/2006 | Sairanen ...................... 370/338 |

OTHER PUBLICATIONS

Windows 98 Update, Author: Johannes Helmig, Published: Dec. 2, 2000 http://www.windowsnetworking.com/articles_tutorials/w98updat.html.*
Getting the Most form Windows Update, Author: Microsoft, Published: May 7, 2002 http://technet.microsoft.com/en-us/library/cc722656.aspx.*

* cited by examiner

*Primary Examiner*—Jeffrey Pwu
*Assistant Examiner*—Noel Beharry
(74) *Attorney, Agent, or Firm*—Garg Law Firm, PLLC; Rakesh Garg; Jeffrey S. LaBaw

(57) ABSTRACT

The invention proposes a solution allowing a web application to generate a response page based on local information of a client. For this purpose, a front-end servlet (receiving a request from the browser of the client) verifies (318, 360) whether the local information is available on the server. If not, a wait page with a command for uploading the local information is generated and sent (321) to the client, so as to cause the client to transmit (327-342) the local information to a back-end servlet of the server. The wait page self-refreshes (348-357) after a predefined delay; in response thereto, the same front-end servlet verifies whether the local information is ready to use. If the uploading is still in progress, a wait page without the upload command (which self-refreshes after the same delay) is generated and sent (363) again. Once the uploading has been completed, the front-end servlet can generate and send (366-372) the desired response page based on the up-to-date local information of the client.

20 Claims, 5 Drawing Sheets

METHOD, SYSTEM AND COMPUTER PROGRAM FOR PROVIDING WEB PAGES BASED ON CLIENT STATE

FIELD OF THE INVENTION

The present invention relates to the data processing field. More specifically, the present invention relates to client/server applications (such as web applications).

BACKGROUND ART

Client/server applications have become very popular in the last years, especially thanks to the widespread diffusion of the Internet. In a client/server application, multiple clients can access shared resources managed by a central server. A typical example is a web application, which consists of a solution that is deployed over the World Wide Web (or simply the web); the web is formed by a system of servers in the Internet supporting specially formatted documents (called web pages).

The main reason of the success of the web applications is the ubiquity of the browsers that are required to surf through the Internet.

Nevertheless, the web applications are not completely satisfactory in some specific situations. For example, a problem arises when the web applications have to operate according to local information that is available on the clients.

In this case, the web page that is used to submit the desired request invokes a command that performs the uploading of the local information onto the server. Once the uploading has been completed, the request is actually submitted to the server for its processing. Typically, this involves the dynamic generation of a new web page, which content is based on the local information that is now available on the server.

A drawback of the solution described above is that it does not allow a correct control of the uploading. Indeed, the user of the client may reiterate the submission of the same request to the server while the uploading is still in progress; a typical example is when the user moves backward and forward with the browser through the web pages of the application. As a result, the uploading of the local information onto the server is repeated for each submission of the request.

This may result in a malfunctioning of the web application; in any case, it causes a network overload for the transmission of the same information to the server.

The above-mentioned drawbacks are particular acute when the local information to be uploaded onto the server consists of a large amount of data.

A specific example is provided by a software distribution application, which is used to enforce desired software configurations on the clients; a commercial software distribution application is the "IBM Tivoli Configuration Manager or ITCM" by IBM Corporation. In this scenario, the user of the client can access the server and submit a synchronization request for applying a selected target software configuration. However, for this purpose the server needs information about a current software configuration of the client (in order to determine the operations to be executed on the client to reach the target software configuration). Therefore, the client has to transmit its current software configuration to the server before submitting the actual synchronization request.

SUMMARY OF THE INVENTION

According to the present invention, the idea of controlling the uploading of the local information by the server is suggested.

Particularly, an aspect of the invention proposes a method for deploying a client/server application by a server entity. The method starts by receiving a service request from a client entity; the processing of the service request requires local information of the client entity. The availability of the local information on the server entity is verified. In response to the non-availability due to the lack of the local information, a wait page (with an upload command for uploading the local information onto the server entity) is sent to the client entity. This causes the client entity to execute the upload command, to display the wait page and to submit the service request to the server entity after a predefined delay. On the other hand, in response to the non-availability due to the uploading of the local information, the wait page is sent to the client entity without the upload command; this causes the client entity to display the wait page and to submit the service request to the server entity after the same delay. At the end, in response to the availability of the local information the service request is processed according to the local information (for example, with a corresponding response page that is returned to the client).

In an embodiment of the invention, the local information on the server (entity) is deleted after sending the response page.

Preferably, the desired result is achieved by self-refreshing the wait page (after the desired delay).

Advantageously, the wait page cannot be cached on the client (entity).

A specific implementation of the invention is based on a back-end servlet, which controls a state attribute indicative of the availability of the local information (in response to the start and to the completion of its uploading); the same state attribute is then accessed by a front-end servlet (which receives the service requests).

A suggested choice is of using a session attribute for this purpose.

Typically, the proposed solution finds use in a web application.

A specific example consists of a software distribution application.

A further aspect of the present invention proposes a computer program for performing the above-described method.

Moreover, another aspect of the present invention proposes a corresponding system.

The characterizing features of the present invention are set forth in the appended claims. The invention itself, however, as well as further features and the advantages thereof will be best understood by reference to the following detailed description, given purely by way of a nonrestrictive indication, to be read in conjunction with the accompanying drawings.

DETAILED DESCRIPTION

Figure 1A:
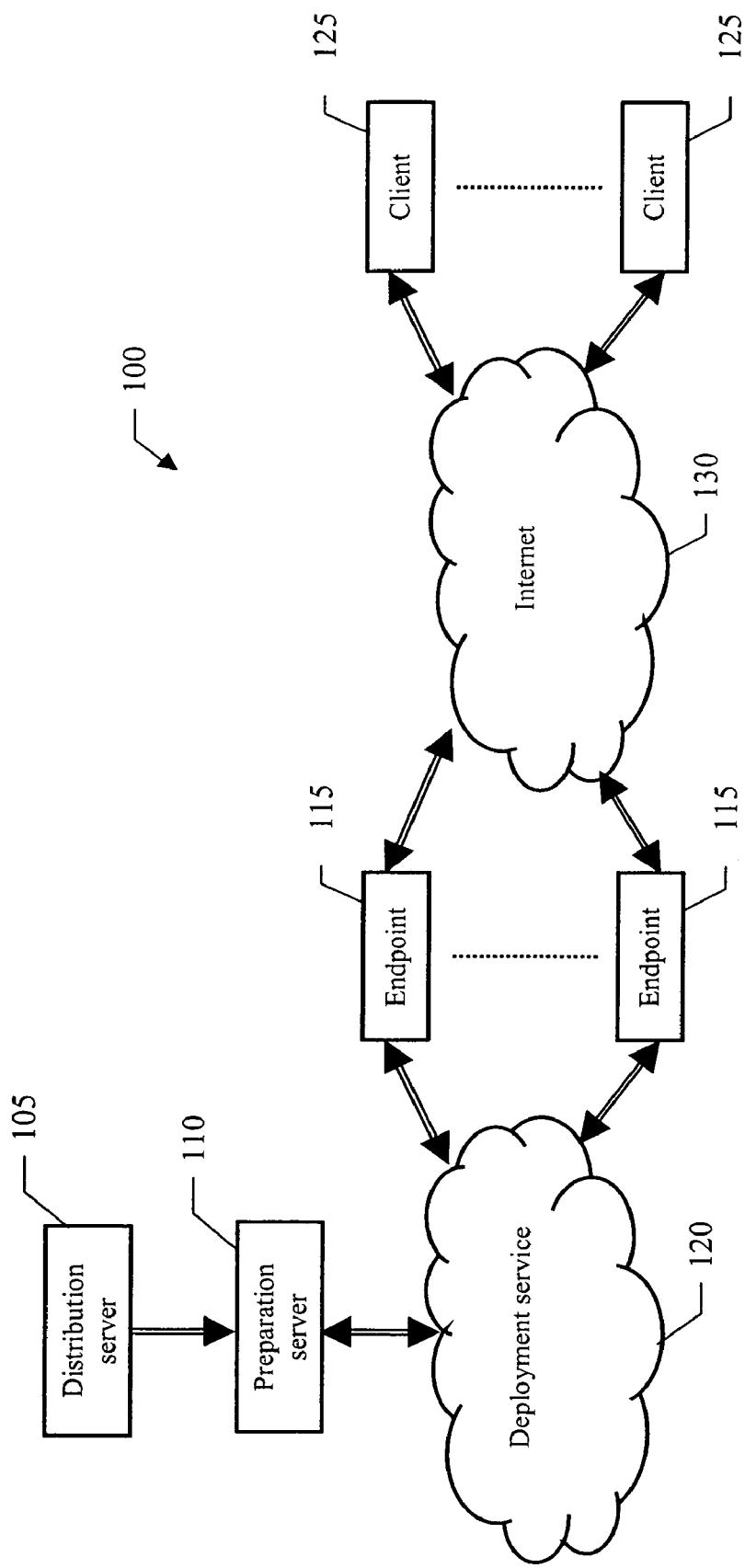
FIG. 1a is a schematic block diagram of a data processing system in which the solution according to an embodiment of the invention is applicable.

With reference in particular to FIG. 1a, a data processing system 100 with distributed architecture is illustrated.

The system 100 implements a software distribution infrastructure (for example, based on the above-mentioned ITCM). Particularly, a distribution server 105 controls a preparation server 110. The preparation server 110 operates as a central site for defining and testing software packages to be used for deploying software products (such as application programs); moreover, the preparation server 110 also acts as a source host providing the required software packages during an actual software distribution process.

Generally, each software package (also known as software package block or SPB) includes an instruction section that defines instructions (possibly conditioned to run-time parameters) to be executed for enforcing a corresponding software configuration (such as installing, removing or updating a software product); moreover, the software package includes a data section that contains an image of any required resources (such as executable modules, configuration files, databases, icons, and the like).

The software packages are distributed to multiple endpoints 115 by means of a deployment service 120 (for example, consisting of the "Multiplexed Distribution or MDIST2" service based on the "Tivoli Management Framework or TMF" by IBM Corporation); the software packages are then applied onto the endpoints 115, so as to enforce the desired software configuration. For example, this result is achieved operating in a disconnected mode (wherein a set of software packages are deployed to selected endpoints 115 according to a predefined plan) or in response to specific requests entered through a command line interface (CLI).

An example of such software distribution infrastructure (and especially of the supported software packages) is described in WO-A-003085513, the entire disclosure of which is herein incorporated by reference.

Moreover, the endpoints 115 may also publish the received software packages. As a result, authorized clients 125 (for example, consisting of mobile personal computers) are allowed to download selected software packages from the endpoints 115 directly over Internet 130. For this purpose, the endpoints 115 act as web servers deploying web applications (which support web pages); each web page is a hypertext document, defined in the HyperText Markup Language (HTML), which provides links to other web pages. More specifically, the definition of the web page includes a series of HTML tags. Those tags specify the properties of the web page, its appearance, and the definition of the available functions; each function (for example, written in the JavaScript language) consists of a series of instructions that are interpreted on the clients 125 for the execution of a corresponding command.

Figure 1B:
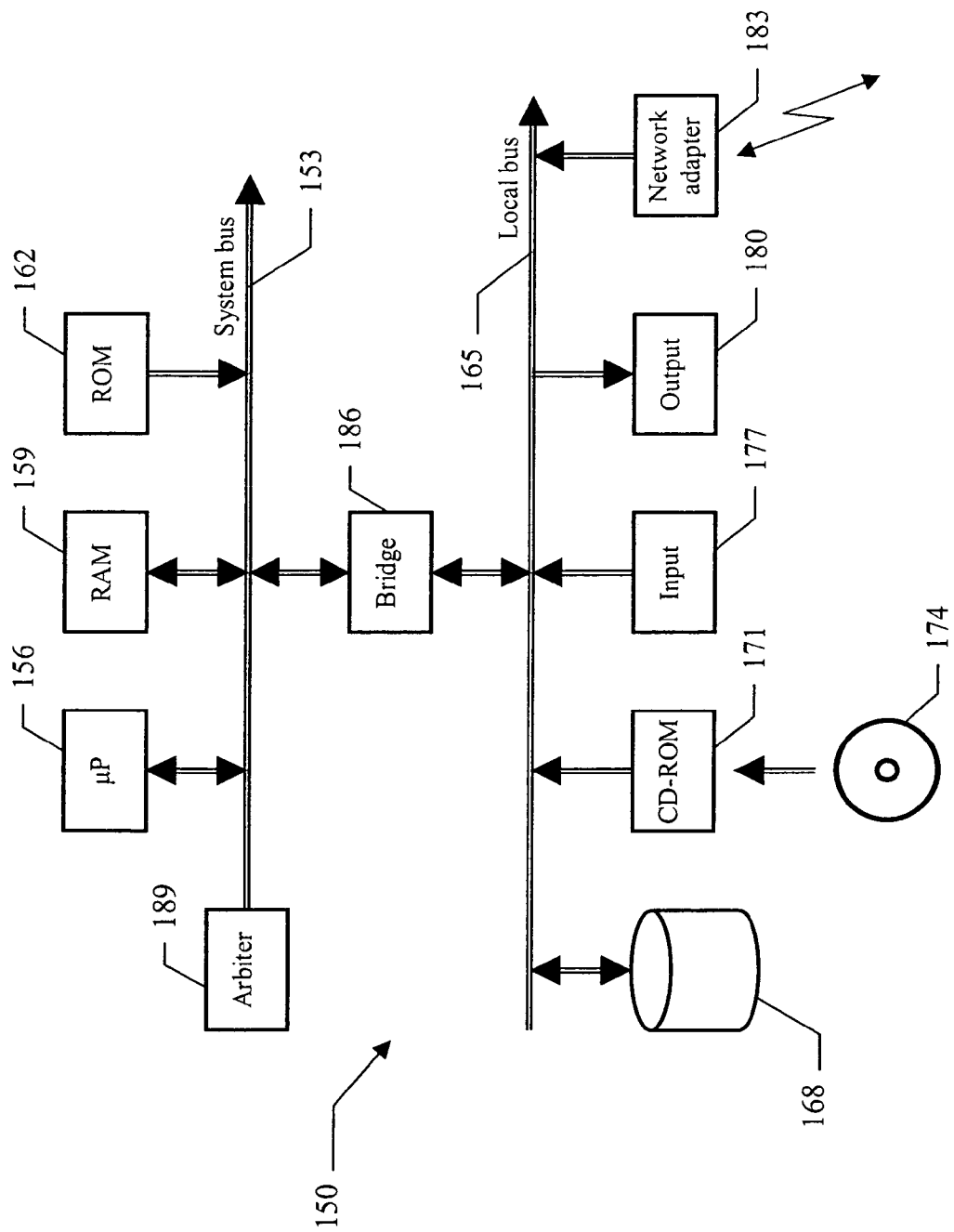
FIG. 1b shows the functional blocks of an exemplary computer of the system.

As shown in FIG. 1b, a generic computer of the system (distribution server, preparation server, endpoint, and client) is denoted with 150. The computer 150 is formed by several units that are connected in parallel to a system bus 153. In detail, one or more microprocessors (µP) 156 control operation of the computer 150; a RAM 159 is directly used as a working memory by the microprocessors 156, and a ROM 162 stores basic code for a bootstrap of the computer 150. Peripheral units are clustered around a local bus 165 (by means of respective interfaces). Particularly, a mass memory consists of a hard-disk 168 and a drive 171 for reading CD-ROMs 174. Moreover, the computer 150 includes input devices 177 (for example, a keyboard and a mouse), and output devices 180 (for example, a monitor and a printer). An adapter 183 is used to connect the computer 150 to a network. A bridge unit 186 interfaces the system bus 153 with the local bus 165. Each microprocessor 156 and the bridge unit 186 can operate as master agents requesting an access to the system bus 153 for transmitting information. An arbiter 189 manages the granting of the access with mutual exclusion to the system bus 153.

Figure 2:
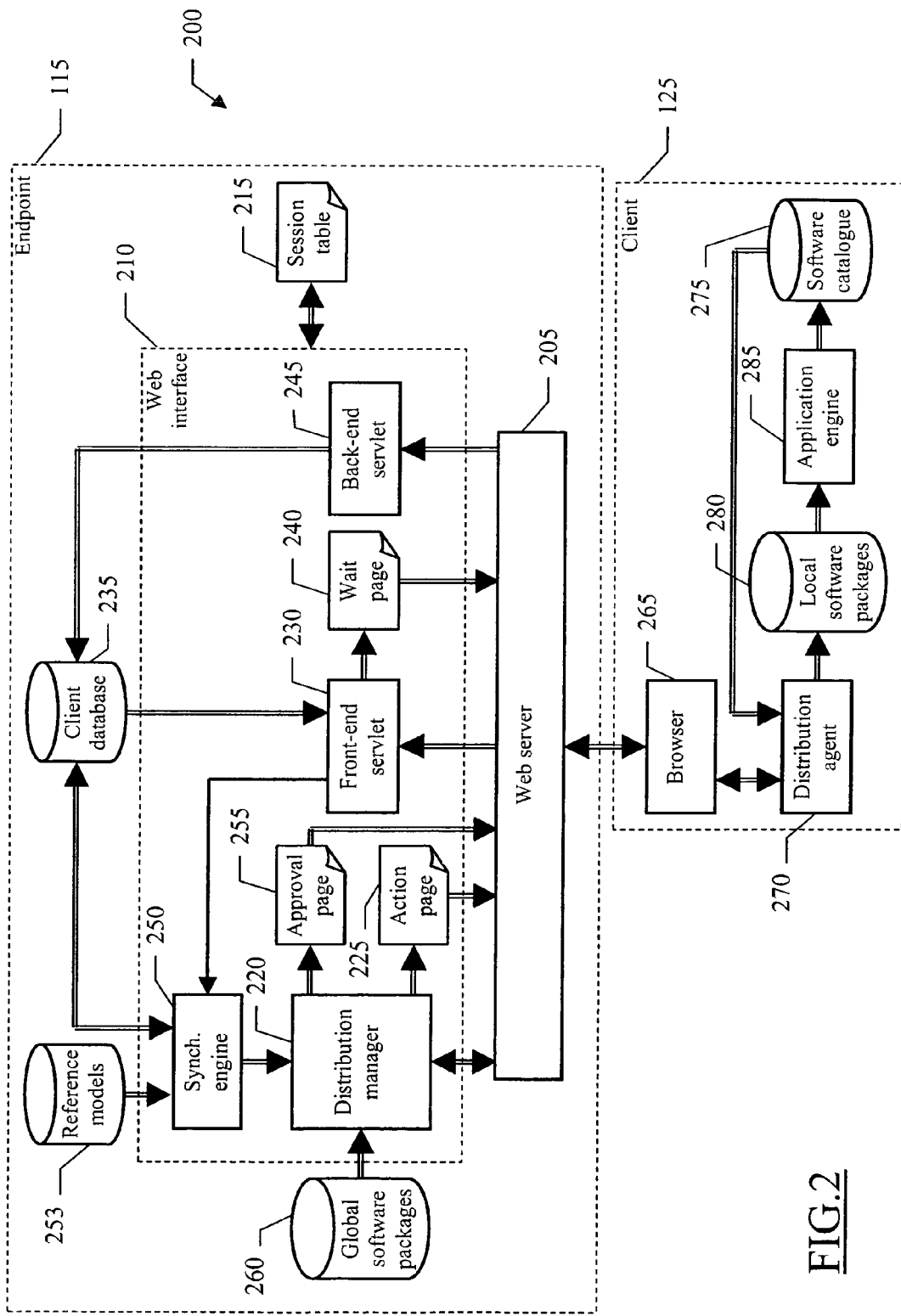
FIG. 2 depicts the main software components that can be used for implementing the solution according to an embodiment of the invention.

Considering now FIG. 2, the main software components that run on the above-described system are denoted as a whole with the reference 200. The information (programs and data) is typically stored on the hard-disk and loaded (at least partially) into the working memory of each computer when the programs are running, together with an operating system and other application programs (not shown in the figure). The programs are initially installed onto the hard disk, for example, from CD-ROM.

With reference in particular to a generic endpoint 115, a web server 205 implements the basic services (for accessing the endpoint 115 through the Internet), which are exploited by any web applications. In the specific example, a web interface 210 (for example, consisting of the "WebUI" service of the above-mentioned ITCM) controls the downloading of the software packages onto the clients.

Whenever a generic client accesses the endpoint 115 (by downloading an entry web page the web interface 210), a session (with a unique identifier) is established for any next request that is submitted by the same client to the endpoint 115. The session is associated with a corresponding object 215 (under the control of the web interface 210), which implements a table used to store information to be shared among the different requests (irrespectively of the intrinsic stateless nature of the web environment).

At the beginning of the session, a distribution manager 220 of the web interface 210 dynamically generates and returns an action page 225 (after authenticating a user of the client and verifying his/her authorizations). The action page 225 lists a series of commands that are available to the client. The action page 225 includes a JavaScript function for each command, which function invokes a corresponding method of a Java applet. The applet consists of a small program (written in the Java language) that is intended to run within another program on the clients; in the specific case, the applet will expose public methods that are used to perform the desired operations. For example, the client may require its synchronization with a selected reference model that defines a target software configuration; the synchronization may be of the standard type (wherein only the new software products are installed) or of the full type (wherein any software product that is not necessary any longer is removed as well).

Assuming that the client has selected the above-mentioned synchronization command, a front-end servlet 230 will receive a corresponding request. The servlet consists of a small program written in the Java language, which is intended to run on servers to answer client requests; the servlet is persistent (i.e., it maintains its state) and can satisfy multiple requests through corresponding threads that run in a single process. In response to the synchronization request, the front-end servlet 230 saves the information included in the submitted request (such as an identifier of the client, a name of the reference model, the type of synchronization, and the like) into a client database 235.

The fulfillment of the synchronization request requires the availability of information about a current software configuration of the client; more in detail, the configuration information is defined by the current state of the software packages that have been applied on the client (such as installed, in error, removed, and the like). The configuration information of the different clients is stored into the same client database 235 (which is accessed by the front-end servlet 230).

If the configuration information of the client is lacking on the endpoint 115, the front-end servlet 230 dynamically builds a wait page 240 and then returns it to the client. The wait page 240 is based on a template including an animated image (such as a hourglass); for example, this result is achieved by means of an animated GIF (which combines several images in the GIF format into a single file). The wait page 240 also includes a refresh tag, which causes the reloading of the wait page 240 on the client after a selected delay (for example, 5-20 s). A non-cached tag is instead used to prevent storing the wait page 240 onto a cache memory of the client (which is generally used to avoid repeated downloading of the same web page during the surfing through the Internet, such as in response to backward and forward commands); in this way, the refresh of the wait page 240 will always provide a fresh version thereof from the endpoint 115. The wait page 240 also includes an upload applet for uploading the configuration information of the client onto the endpoint 115. In the above-mentioned condition (i.e., when the configuration information of the client is lacking), the front-end servlet 230 inserts an onload tag into the wait page 240, which onload tag specifies the execution of the upload applet when the wait page 240 is opened.

The execution of the upload applet on the client causes the transmission of its configuration information to a back-end servlet 245. As soon as the back-end servlet 245 starts receiving the configuration information from the client, it deasserts a specific attribute of the session indicative of the availability of the configuration information (in the session table 215). The configuration information is then written into the client database 235; once the uploading of the configuration information has been completed, the back-end servlet 245 asserts the same availability attribute. This choice strongly reduces the time required to verify the current state of the configuration information (since the access to the availability attribute is very fast).

As a consequence, when the front-end servlet 230 receives any refresh request of the wait page 240 from the client, it verifies the value of the availability attribute in the session table 215. If the availability attribute is deasserted (i.e., the uploading of the configuration information is still in progress), the servlet 230 again builds the wait page 240 and returns it to the client. However, in this case no onload tag is inserted into the wait page 240, so that the upload applet will not be executed at its opening on the client.

Conversely, when the uploading has been completed and the configuration information is ready in the client database 235 (availability attribute asserted), the front-end servlet 230 invokes a synchronization engine 250. The synchronization engine 250 retrieves the information about the synchronization request (i.e., the identifier of the client, the name of the reference model, and its type) from the client database 235. The synchronization engine 250 then compares the configuration information of the client (in the database 235) with the definition of the selected reference model, which is stored in a database 253 (downloaded from the distribution server). Each reference model is defined by a target state of a series of software packages (such as installed and committed, installed in an undoable manner, or removed). The synchronization engine 250 accordingly generates a list of activities, which are required to reach the target software configuration (defined by the reference model) starting from the current software configuration of the client; for example, the activity list specifies the installation of the software packages that are not available yet, the removal of the software packages that are not required any longer (when the synchronization is of the full type), and the like. Once the above-described operation has been completed, the synchronization engine 250 removes the information from the client database 235 and deletes the availability attribute from the session table 215. This ensures that the configuration information processed by the endpoint 115 is always up-to-date (so as to reflect the actual state of the client at the moment).

The activity list so obtained is now passed to the distribution manager 220. In response thereto, the distribution manager 220 dynamically builds an approval page 255 and then returns it to the client. The approval page 255 lists the activities that should be performed on the client (to enforce the target software configuration of the selected reference model), and prompts the user of the client to approve their execution. If the user accepts to continue the process, the distribution manager 220 transmits the relevant software packages with an indication of their target states to the client; for this purpose, the software packages are extracted from a global repository 260 (which stores all the available software packages that have been downloaded from the preparation server).

Considering now a generic client 125, a browser 265 is used to surf through the Internet, in order to locate and display desired web pages. The browser 265 is provided with a plug-in module, which enables it to interpret instructions written in the JavaScript language.

The browser 265 interfaces with a distribution agent 270 to implement the above-described software distribution process. For this purpose, the distribution agent 270 accesses a software catalogue 275, which stores the configuration information of the client 125 (i.e., the current state of the applied software packages). The distribution agent 270 also saves each software package that has been downloaded from the endpoint 115 into a local repository 280. The local repository 280 is accessed by an application engine 285 (such as the "Software Installation Engine or SIE" service of the above-mentioned ITCM), which enforces their application on the client 125. The application engine 285 updates the software catalogue 275 according to the result of the application of each software package.

Figure 3A:
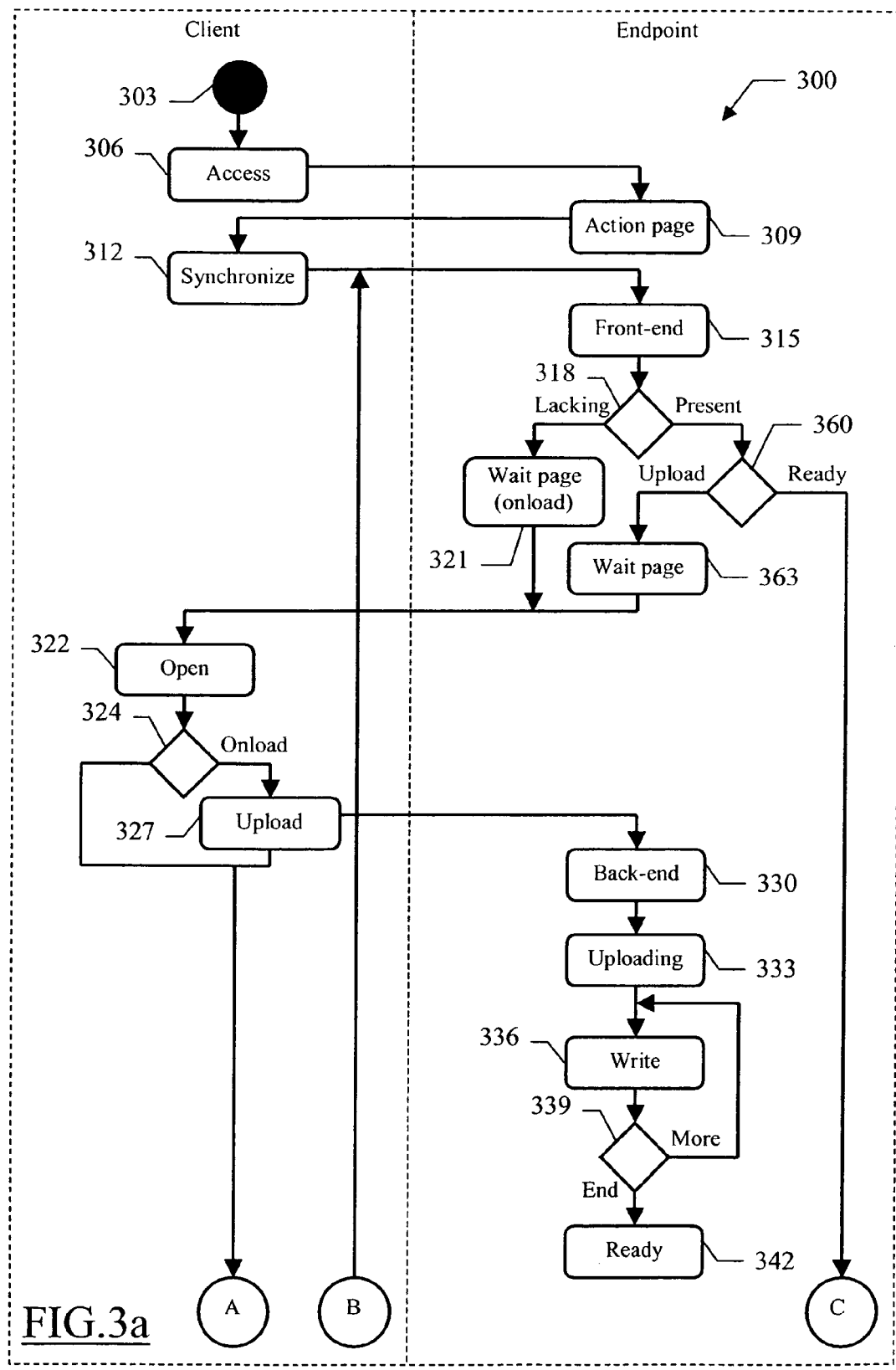
FIGS. 3a-3b show a diagram describing the flow of activities relating to an implementation of the solution according to an embodiment of the invention.
Figure 3B:
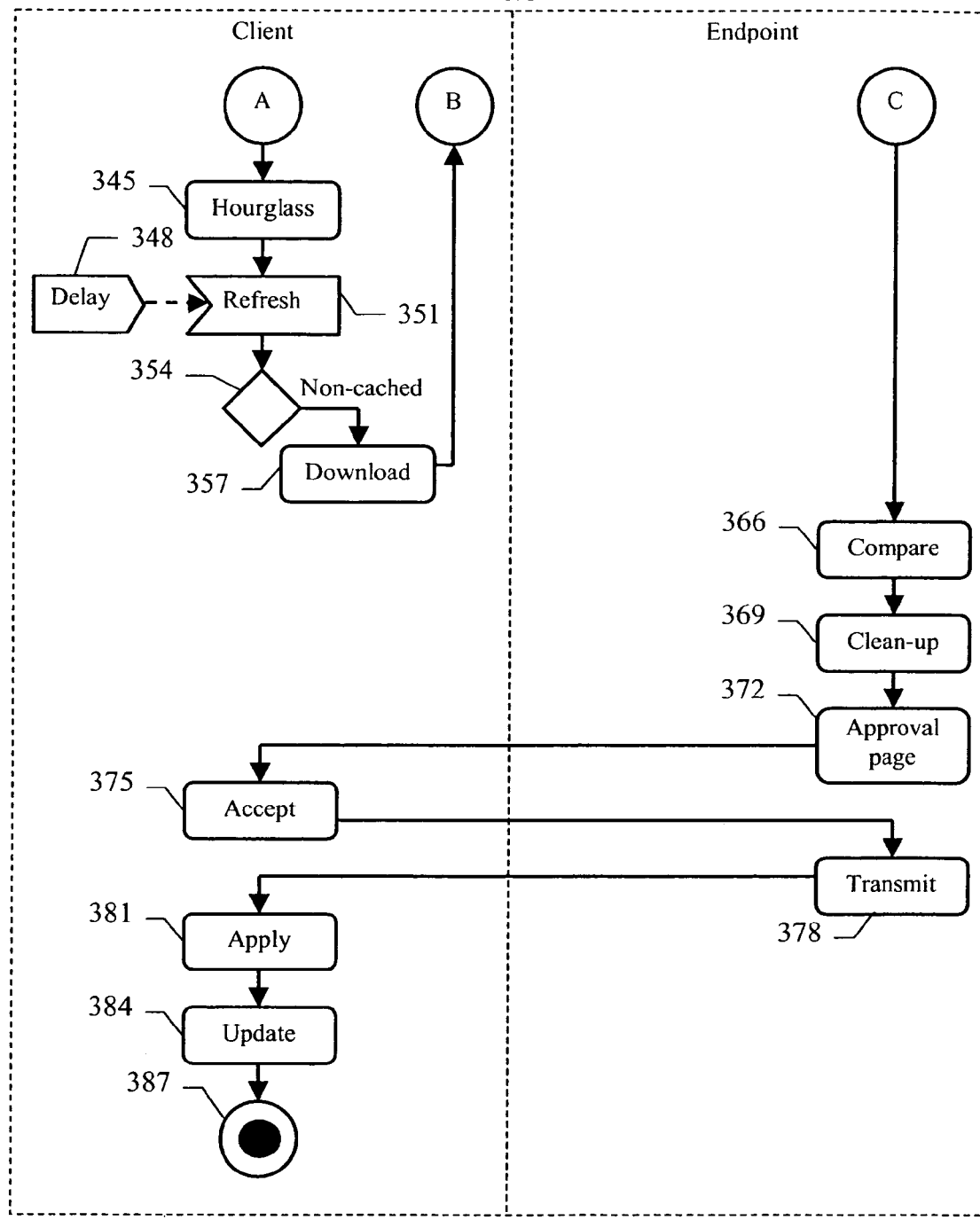

With reference now to FIGS. 3*a*-3*b*, the logic flow of an exemplary software distribution process that can be implemented in the above-described system is represented with a method 300. The method 300 begins at the black start circle 303 in the swim-lane of the generic client, and then passes to block 306 wherein the client accesses the web interface on the endpoint. In response thereto, the distribution manager at block 309 authenticates the user and verifies his/her authorizations; if the result of the verification is positive, the distribution manager opens a new session with the client, and then dynamically generates and returns the action page (listing the available commands).

Returning to the swim-lane of the client at block 312, the browser displays the action page; assuming that the client has selected the synchronization command, the corresponding JavaScript function prepares the information required to execute the operation (i.e., the identifier of the client, the name of the selected reference model, the type of synchronization), and then invokes the associated applet. The applet in turn forwards the synchronization request (with the required information) to the front-end servlet (block 315); in response thereto, the front-end servlet saves the information relating to the synchronization request into the client database.

A test is then made at block 318 to determine whether the configuration information of the client is available on the endpoint. If the configuration information is lacking, the front-end servlet at block 321 dynamically builds and returns the wait page with the onload tag (for the upload applet). The user browser of the client starts opening the wait page at block 322. The flow of activity then branches at block 324. In the current situation wherein the wait page includes the onload tag, the browser at block 327 executes the upload applet (included in the wait page). The upload applet in turn invokes the distribution agent to retrieve the configuration information of the client (from the software catalogue), to serialize this information into a stream of packets, and to upload it onto the back-end servlet (block 330).

In response to the start of the uploading, the back-end servlet at block 333 deasserts the availability attribute in the session table. Continuing to block 336, the back-end servlet writes each received packet of the configuration information into the client database. A test is then made at block 339 to determine whether the uploading has been completed. If not, the method returns to block 336 to repeat the same operation continuously. Conversely, once the uploading has been completed (for example, as indicated by an end-of-data packet), the back-end servlet at block 342 asserts the availability attribute in the session table, and then ends its execution.

At the same time, the browser continues opening the wait page (descending from block 327 to block 345); in this phase, the animated image (i.e., the hourglass) is displayed. As soon as the delay specified in the refresh tag of the wait page expires (block 348), the wait page is reloaded at block 351. For this purpose, the browser at block 354 verifies whether the wait page is available in the cache memory of the client. In this case, the result of the verification will be always negative (since the non-cached tag of the wait page has prevented its caching); therefore, the method proceeds to block 357 wherein the browser requests the downloading of the wait page to the endpoint. This operation again involves the invocation of the front-end servlet at block 315, so as to reiterate the above-described steps.

However, the execution of the test at block 318 now determines that the configuration information of the client is present on the endpoint (as a result of its uploading). The front-end servlet then verifies at block 360 whether the configuration information is ready to use.

If the uploading is still in progress (availability attribute deasserted), the front-end servlet at block 363 dynamically builds the wait page without the onload tag, and returns it to the client. The flow of activity now goes back to block 322 to repeat the same operations described above. In this case, the method will pass from block 324 to block 345 directly (since the upload applet is not executed due to the lack of the onload tag in the wait page). As in the preceding case, the hourglass is displayed (block 345) and the downloading of the wait page is requested for its refreshing as soon as the corresponding delay expires (blocks 348-357).

Returning to block 360, once the uploading of the configuration information has been completed (availability attribute asserted), the flow of activity descends into block 366; as a consequence, the synchronization engine retrieves the information about the synchronization request from the client database, and then compares the configuration information of the client with the definition of the selected reference model (so as to obtain the list of activities required to reach the target software configuration starting from the current one). Continuing to block 369, the synchronization engine performs a cleanup of the environment (by removing the information from the client database and deleting the availability attribute from the session table). The distribution manager at block 372 dynamically builds the approval page accordingly, and then returns it to the client.

Returning to the swim-lane of the client at block 375, the browser displays the approval page; assuming that the user accepts to continue the process, a corresponding response is returned to the endpoint. As a result, the distribution manager at block 378 transmits the relevant software packages (with the indication of their target states) to the client. In response thereto, the application engine of the client enforces their application at block 381. At the same time, the application engine at block 384 updates the software catalogue of the client according to the result of the operation. The method then ends at the concentric black/white stop circles 387.

In this way, the uploading of the configuration information is completely under the control of the endpoint (i.e., the server side of the software distribution application). This allows managing the operation correctly in any situations. Particularly, even if the user of the client should reiterate the submission of the same request to the endpoint while the uploading is still in progress (for example, by moving backward and forward with the browser through the pages of the web interface), it would only receive the wait page without starting a further uploading (since the server can now determine that the same request has already been received). This prevents any malfunctioning of the software distribution application; in any case, it avoids any network overload for the transmission of the same information to the endpoint. The above-mentioned advantages are clearly perceived when the configuration information consists of a large amount of data.

Naturally, in order to satisfy local and specific requirements, a person skilled in the art may apply to the solution described above many modifications and alterations. Particularly, although the present invention has been described with a certain degree of particularity with reference to preferred embodiment(s) thereof, it should be understood that various omissions, substitutions and changes in the form and details as well as other embodiments are possible; moreover, it is expressly intended that specific elements and/or method steps described in connection with any disclosed embodiment of the invention may be incorporated in any other embodiment as a general matter of design choice.

For example, similar considerations apply if the system has a different architecture or includes equivalent units. Moreover, each computer may have another structure or may include similar elements (such as cache memories temporarily storing the programs or parts thereof to reduce the accesses to the mass memory during execution); in any case, it is possible to replace the computer with any code execution entity (such as a PDA, a mobile phone, and the like).

Even though in the preceding description reference has been made to a specific service that is deployed by the endpoint, this is not to be intended as a limitation (with the execution of the same process that can be controlled by any other service provider, such as a cluster of computers).

It should also be noted that the solution of the invention has equal applicability to any other request that may be submitted by the clients (for example, for installing a selected program).

Moreover, the proposed wait page (with the respective animated image and tags) is merely illustrative, and it must not be interpreted in a limitative manner (with the same result that may be achieved by means of any other page including equivalent commands); for example, it is possible to change the wait page at every refresh (to indicate the start of the uploading and its progress). Similar considerations apply if the endpoint returns a different response page to the client, or more generally if the synchronization request is processed in any other way (according to the configuration information that has been received from the client).

In any case, the uploading of the configuration information of the client onto the server may be performed with any other technique (for example, using session attributes directly).

In addition, in some applications the possibility of deleting the configuration information on the endpoint with a different policy (for example, after a predefined delay) is not excluded.

Nothing prevents the use of alternative techniques for causing the wait page to submit the synchronization request to the front-end servlet.

Likewise, it is possible to prevent the caching of the wait page on the client with different solutions.

It should also be emphasized that the front-end servlet and the back-end servlet may be replaced with any other equivalent module (such as CGIs).

Moreover, the use of the availability attribute is not strictly necessary; for example, the same result may also be achieved by means of a flag associated with the configuration information in the client database (so as to allow extending to same verification of the availability of the configuration information among different sessions of the same client with the endpoint).

Although in the preceding description reference has been made to a web application and to web pages, this is not to be intended as a limitation; more generally, the solution of the invention can be applied to any other client/server application based on the use of similar documents (formatted in whatever language).

Likewise, the described example relating to the software distribution application is merely illustrative (with the same technical idea that may be extended to any similar scenario, wherein local information of the client is required to process the submitted service requests).

Similar considerations apply if the program (which may be used to implement the invention) is structured in a different way, or if additional modules or functions are provided; likewise, the memory structures may be of other types, or may be replaced with equivalent entities (not necessarily consisting of physical storage media). Moreover, the proposed solution lends itself to be implemented with an equivalent method (having similar or additional steps, even in a different order). In any case, the program may take any form suitable to be used by or in connection with any data processing system, such as external or resident software, firmware, or microcode (either in object code or in source code). Moreover, the program may be provided on any computer-usable medium; the medium can be any element suitable to contain, store, communicate, propagate, or transfer the program. Examples of such medium are fixed disks (where the program can be pre-loaded), removable disks, tapes, cards, wires, fibers, wireless connections, networks, broadcast waves, and the like; for example, the medium may be of the electronic, magnetic, optical, electromagnetic, infrared, or semiconductor type.

In any case, the solution according to the present invention lends itself to be carried out with a hardware structure (for example, integrated in a chip of semiconductor material), or with a combination of software and hardware.

The invention claimed is:

1. A method for deploying a client/server application by a server entity including the steps of:
    receiving a service request from a client entity, the processing of the service request requiring local information of the client entity;
    verifying the availability of the local information on the server entity;
    in response to the non-availability due to the lack of the local information at the server entity, sending a wait page, with an upload command for uploading the local information from the client entity onto the server entity, to the client entity thereby causing the client entity to execute the upload command, to display the wait page and to submit the service request to the server entity after a predefined delay;
    in response to the non-availability due to ongoing uploading of the local information from the client entity to the server entity, sending the wait page, without the upload command, to the client entity thereby causing the client entity to display the wait page and to submit the service request to the server entity after said delay; and
    in response to the availability of the local information processing the service request according to the local information.

2. The method according to claim 1, further including the step of:
    deleting the local information on the server entity in response to the processing of the service request.

3. The method according to claim 1, wherein the wait page includes a refresh command for refreshing the wait page after said delay, the refreshing including requesting the downloading of the wait page to the client entity thereby involving the submission of the service request.

4. The method according to claim 3, wherein the refreshing includes verifying the availability of the wait page cached on the client entity and requesting the downloading of the wait page to the client entity in response to the non-availability of the cached wait page, the wait page including a non-cached attribute for preventing the caching of the wait page.

5. The method according to claim 1, further including the steps of:
    a back-end module adapted to receive the uploaded local information deasserting a state attribute in response to the start of the uploading to indicate the non-availability due to the uploading of the local information and asserting the state attribute in response to the completion of the uploading to indicate the availability of the local information; and
    a front-end module adapted to receive the service request accessing the state attribute for verifying the availability of the local information.

6. The method according to claim 5, wherein the state attribute is an attribute of a session between the client entity and the server entity.

7. The method according to claim 1, wherein the client/server application is a web application.

8. The method according to claim 1, wherein the client/server application is a software distribution application, the service request is a synchronization request for synchronize the client entity with a target software configuration, and the local information is a software catalogue indicative of a current software configuration of the client entity, the processing of the synchronization request involving the generation of a list of activities for reaching the target software configuration from the current software configuration.

9. A computer program product including a computer-usable tangible storage medium embodying a computer program, the computer program when executed on a server entity causing the server entity to perform a method for deploying a client/server application, wherein the method includes the steps of:

receiving a service request from a client entity, the processing of the service request requiring local information of the client entity;

verifying the availability of the local information on the server entity;

in response to the non-availability due to the lack of the local information at the server entity, sending a wait page, with an upload command for uploading the local information from the client entity onto the server entity, to the client entity thereby causing the client entity to execute the upload command, to display the wait page and to submit the service request to the server entity after a predefined delay;

in response to the non-availability due to ongoing uploading of the local information from the client entity to the server entity, sending the wait page, without the upload command, to the client entity thereby causing the client entity to display the wait page and to submit the service request to the server entity after said delay; and in response to the availability of the local information processing the service request according to the local information.

10. The computer program product according to claim 9, further including the step of:

deleting the local information on the server entity in response to the processing of the service request.

11. The computer program product according to claim 9, wherein the wait page includes a refresh command for refreshing the wait page after said delay, the refreshing including requesting the downloading of the wait page to the client entity thereby involving the submission of the service request.

12. The computer program product according to claim 11, wherein the refreshing includes verifying the availability of the wait page cached on the client entity and requesting the downloading of the wait page to the client entity in response to the non-availability of the cached wait page, the wait page including a non-cached attribute for preventing the caching of the wait page.

13. The computer program product according to claim 9, further including the steps of:

a back-end module adapted to receive the uploaded local information deasserting a state attribute in response to the start of the uploading to indicate the non-availability due to the uploading of the local information and asserting the state attribute in response to the completion of the uploading to indicate the availability of the local information; and a front-end module adapted to receive the service request accessing the state attribute for verifying the availability of the local information.

14. The computer program product according to claim 13, wherein the state attribute is an attribute of a session between the client entity and the server entity.

15. The computer program product according to claim 9, wherein the client/server application is a web application.

16. The computer program product according to claim 9, wherein the client/server application is a software distribution application, the service request is a synchronization request for synchronize the client entity with a target software configuration, and the local information is a software catalogue indicative of a current software configuration of the client entity, the processing of the synchronization request involving the generation of a list of activities for reaching the target software configuration from the current software configuration.

17. A server entity for deploying a client/server application including:

a storage device including a storage medium, wherein the storage device stores computer usable program code; and a processor, wherein the processor executes the computer usable program code, and wherein the computer usable program code comprises:

computer usable code for receiving a service request from a client entity, the processing of the service request requiring local information of the client entity;

computer usable code for verifying the availability of the local information on the server entity;

computer usable code responsive to the non-availability due to the lack of the local information at the server entity, for sending a wait page, with an upload command for uploading the local information from the client entity onto the server entity, to the client entity thereby causing the client entity to execute the upload command, to display the wait page and to submit the service request to the server entity after a predefined delay;

computer usable code responsive to the non-availability due to ongoing uploading of the local information from the client entity to the server entity, for sending the wait page, without the upload command, to the client entity thereby causing the client entity to display the wait page and to submit the service request to the server entity after said delay; and computer usable code responsive to the availability of the local information for processing the service request according to the local information.

18. The server entity according to claim 17, further including:

computer usable code for deleting the local information on the server entity in response to the processing of the service request.

19. The server entity according to claim 17, wherein the wait page includes a refresh command for refreshing the wait page after said delay, the refreshing including requesting the downloading of the wait page to the client entity thereby involving the submission of the service request.

20. The server entity according to claim 19, wherein the refreshing includes verifying the availability of the wait page cached on the client entity and requesting the downloading of the wait page to the client entity in response to the non-availability of the cached wait page, the wait page including a non-cached attribute for preventing the caching of the wait page.

* * * * *

UNITED STATES PATENT AND TRADEMARK OFFICE
CERTIFICATE OF CORRECTION

PATENT NO. : 7,668,905 B2 Page 1 of 1
APPLICATION NO. : 11/291441
DATED : February 23, 2010
INVENTOR(S) : Bernardini et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1049 days.

Signed and Sealed this

Seventh Day of December, 2010

David J. Kappos
*Director of the United States Patent and Trademark Office*